US008351436B2

(12) United States Patent
Yoon et al.

(10) Patent No.: US 8,351,436 B2
(45) Date of Patent: Jan. 8, 2013

(54) APPARATUS AND METHOD FOR EFFICIENT BANDWIDTH ALLOCATION ON TIME DIVISION MULTIPLE ACCESS-BASED PASSIVE OPTICAL NETWORK (TDMA-PON)

(75) Inventors: Bin-yeong Yoon, Daejeon-si (KR); Man-soo Han, Jeollanam-do (KR); Sung-chang Kim, Gwangju-si (KR); Hark Yoo, Gwangju-si (KR); Dong-soo Lee, Gwangju-si (KR); Jong-deog Kim, Gwangju-si (KR); Kyeong-hwan Doo, Daejeon-si (KR); Yong-tae Kim, Daejeon-si (KR); Kwang-ok Kim, Jeonju-si (KR); Bong-kyu Kim, Daejeon-si (KR); Geun-yong Kim, Goyang-si (KR); Sung-hoon Kwak, Daejeon-si (KR); Mun-seob Lee, Gwangju-si (KR); Le Quan, Gwangju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 356 days.

(21) Appl. No.: 12/597,850

(22) PCT Filed: Aug. 19, 2008

(86) PCT No.: PCT/KR2008/004804
§ 371 (c)(1),
(2), (4) Date: Oct. 27, 2009

(87) PCT Pub. No.: WO2009/069880
PCT Pub. Date: Jun. 4, 2009

(65) Prior Publication Data
US 2010/0221006 A1 Sep. 2, 2010

(30) Foreign Application Priority Data

Nov. 27, 2007 (KR) .................. 10-2007-0121605

(51) Int. Cl.
*H04L 12/28* (2006.01)
*H04L 12/56* (2006.01)
(52) U.S. Cl. ................... 370/395.51; 370/468
(58) Field of Classification Search .................. None
See application file for complete search history.

(56) References Cited

U.S. PATENT DOCUMENTS
7,720,072 B2 * 5/2010 Tan et al. ............. 370/395.21
(Continued)

FOREIGN PATENT DOCUMENTS
KR 1020050118390 A 12/2005
KR 10-0566294 A 3/2006
KR 1020070062341 A 6/2007

OTHER PUBLICATIONS
International Search Report: PCT/KR2008/004804.

*Primary Examiner* — Phirin Sam
(74) *Attorney, Agent, or Firm* — Ladas & Parry LLP (57) ABSTRACT

Provided are an apparatus and method for efficiently and dynamically allocating a bandwidth on a Time Division Multiple Access-based Passive Optical Network (TDMA PON). The dynamic bandwidth allocation apparatus for uplink data transmission of a plurality of Optical Network Units (ONUs) including a plurality of class queues corresponding to Transmission Container (T-CONT) types, the plurality of ONUs connected to an Optical Line Terminal (OLT) on a Passive Optical Network (PON), includes: a class queue information storage unit storing information regarding a bandwidth allocation period and an allocatable bandwidth amount for each T-CONT type; an allocation check table unit checking the bandwidth allocation period for the T-CONT type received from the class queue information storage unit, and determining an allocatable bandwidth amount for the T-CONT type; and a bandwidth allocation unit allocating an uplink bandwidth to the T-CONT type with reference to the bandwidth allocation period and the allocatable bandwidth amount for the T-CONT type, and re-allocating to each ONU an uplink bandwidth remaining after allocating a total uplink bandwidths to all T-CONT types.

9 Claims, 4 Drawing Sheets

U.S. PATENT DOCUMENTS

| | | | |
|---|---|---|---|
| 7,924,870 B2 * | 4/2011 | Bashan et al. | 370/462 |
| 2006/0233197 A1 | 10/2006 | Elmoalem et al. | |
| 2007/0019957 A1 * | 1/2007 | Kim et al. | 398/72 |
| 2007/0133988 A1 | 6/2007 | Kim et al. | |
| 2007/0133989 A1 * | 6/2007 | Kim et al. | 398/69 |
| 2007/0248109 A1 * | 10/2007 | DeCarolis et al. | 370/412 |
| 2010/0008379 A1 * | 1/2010 | Yoo et al. | 370/468 |

* cited by examiner

APPARATUS AND METHOD FOR EFFICIENT BANDWIDTH ALLOCATION ON TIME DIVISION MULTIPLE ACCESS-BASED PASSIVE OPTICAL NETWORK (TDMA-PON)

TECHNICAL FIELD

The present invention relates to a Passive Optical Network (PON), and more particularly, to an apparatus and method for dynamic allocation of bandwidth, which are utilized when an Optical Line Terminal (OLT) transmits uplink data to Optical Network Units (ONUs) on a Time Division Multiple Access-based Passive Optical Network (TDMA-PON).

BACKGROUND ART

A Passive Optical Network (PON) provides very high-speed services to businesses, small office home offices (SOHOs), and homes, through optical fibers, and has such a name because it constitutes an optical communication network with passive elements. Generally, in a PON, an optical line terminal (OLT) is installed in a central office, and a plurality of Optical Network Units (ONUs) are connected to the OLT via a 1:N optical star coupler. Such a PON is classified into a Broadband PON (B-PON), a Gigabit PON (G-PON), and a Gigabit Ethernet PON (GE-PON).

The B-PON is aimed at receiving all existing electrical communication services, and transmitting data signals by allocating them to Asynchronous Transfer Mode (ATM) cells. The G-PON, like the B-PON, is aimed at receiving all electrical communication services, and adopts a G-PON Encapsulation Method (GEM) to efficiently receive Ethernet frames. Since GEM frames can be defined by the same time unit as that used in existing electrical communication services, the GEM frames can be efficiently used for existing services using telephone lines or private lines.

The GE-PON, which is also called an E-PON, has an advantage of high-speed data transmission, and allows transmission of high quality Internet Protocol (IP) images, IP telephony, and video phone services. The B-PON, G-PON, and GE-PON have been standardized by the ITU-T and IEEE.

The G-PON stores and transmits uplink data using a plurality of class queues that are called transmission containers (T-CONTs), for each service, in order to allow ONUs to receive various types of traffic.

Also, an OLT collects wait state information of all T-CONTs that operate on a link, and allocates an uplink bandwidth to each T-CONT on the basis of the wait state information. Specifically, the G-PON allows each ONU to transmit uplink frames in units of a frame of 125 us, in order to support voice services, etc. having strict delay conditions.

As such, in order to improve the efficiency of a network and guarantee transmission quality when ONUs transmit uplink data, dynamic bandwidth allocation is needed which calculates an uplink bandwidth of each T-CONT for each frame on the basis of service level agreement (SLA) and wait state information of the T-CONT.

A conventional dynamic bandwidth allocation method has been developed which allocates a predetermined bandwidth to T-CONTs, on the basis of a bandwidth allocation period and a bandwidth allocation amount for each T-CONT that are calculated by SLA of the T-CONT, regardless of wait state information of the T-CONTs. In the conventional method, since a bandwidth is allocated to each T-CONT regardless of the T-CONT's wait state information, an uplink bandwidth is allocated to the T-CONT even when no data waiting for uplink transmission exists in the T-CONT, which causes an unnecessary waste of bandwidth.

Another conventional dynamic bandwidth allocation method has been developed in which bandwidths are allocated to all ONUs under the same service condition. In order to uniformly allocate bandwidths to a plurality of ONUs requiring allocation of bandwidth, an uplink bandwidth is divided by the number of ONUs.

Then, the resultant bandwidth (that is, an additional bandwidth) is compared with a bandwidth required by each ONU, and bandwidths required by ONUs are allocated to the ONUs if the ONUs require bandwidths smaller than the additional bandwidth, and an additional bandwidth is allocated to ONUs requiring bandwidths greater than the additional bandwidth.

However, in this conventional method, since bandwidths are allocated to a plurality of ONUs requiring allocation of bandwidth, the unnecessary waste of bandwidth as described above is avoided. However, if any bandwidth remains after bandwidths are allocated to the plurality of ONUs, the remaining bandwidth will be discarded without being used.

DISCLOSURE OF INVENTION

Technical Problem

A variety of conventional methods other than the above-described methods have been developed to dynamically allocate a bandwidth, but, these also could not reduce the time used to allocate an uplink bandwidth to T-CONTs. As a result, the conventional methods have difficulties in efficient transmission of uplink data.

Technical Solution

The present invention provides a dynamic bandwidth allocation apparatus and method which can improve efficiency in the use of uplink bandwidth by uniformly allocating an uplink bandwidth, if any, remaining after bandwidth allocation to all optical network units (ONUs), using service level agreement (SLA) information and wait state information of transmission containers (T-CONTs), and which can reduce processing time used to calculate a bandwidth that is to be allocated to each T-CONT.

According to an aspect of the present invention, there is provided a dynamic bandwidth allocation apparatus for uplink data transmission of a plurality of Optical Network Units (ONUs) including a plurality of class queues corresponding to Transmission Container (T-CONT) types, the plurality of ONUs connected to an Optical Line Terminal (OLT) on a Passive Optical Network (PON), including: a class queue information storage unit storing information regarding a bandwidth allocation period and an allocatable bandwidth amount for each T-CONT type; an allocation check table unit checking the bandwidth allocation period for the T-CONT type received from the class queue information storage unit, and determining an allocatable bandwidth amount for the T-CONT type; and a bandwidth allocation unit allocating an uplink bandwidth to the T-CONT type with reference to the bandwidth allocation period and the allocatable bandwidth amount for the T-CONT type, and re-allocating to each ONU an uplink bandwidth remaining after allocating a total uplink bandwidths to all T-CONT types.

According to another aspect of the present invention, the remaining uplink bandwidth is additionally allocated to each ONU and stored in a virtual T-CONT type, and each ONU allocates the remaining uplink bandwidth to the virtual T-CONT type according to priorities of the T-CONT types.

Here, in order to allocate the remaining uplink bandwidth additionally to each ONU, the remaining uplink bandwidth is divided by the number of ONUs and the divided uplink bandwidth is uniformly allocated to each ONU.

Here, by adjusting the remaining uplink bandwidth after allocating the uplink bandwidth for each T-CONT type, the remaining uplink bandwidth can be all used.

It is to be understood that both the foregoing general description and the following detailed description are exemplary and explanatory and are intended to provide further explanation of the invention as claimed.

Advantageous Effects

As described above, in an apparatus and method for allocating a bandwidth dynamically and efficiently on a Time Division Multiple Access-based Passive Optical Network (TDMA-PON), according to the present invention, by uniformly allocating an uplink bandwidth, if any, remaining after bandwidth allocation to all ONUs if the amount of traffic input to all the ONUs is smaller than the uplink bandwidth, it is possible to effectively reduce a delay which occurs due to a difference between the queue length of each T-CONT and a bandwidth which can be allocated to the T-CONT.

Furthermore, by uniformly distributing a bandwidth, if any, remaining after bandwidth allocation to ONUs on the basis of queue state reports received from the ONUs, in such a manner that the remaining bandwidth is uniformly allocated to T-CONTs of the ONUs in the order of the T-CONTs priorities, an uplink bandwidth can be efficiently used.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

MODE FOR THE INVENTION

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
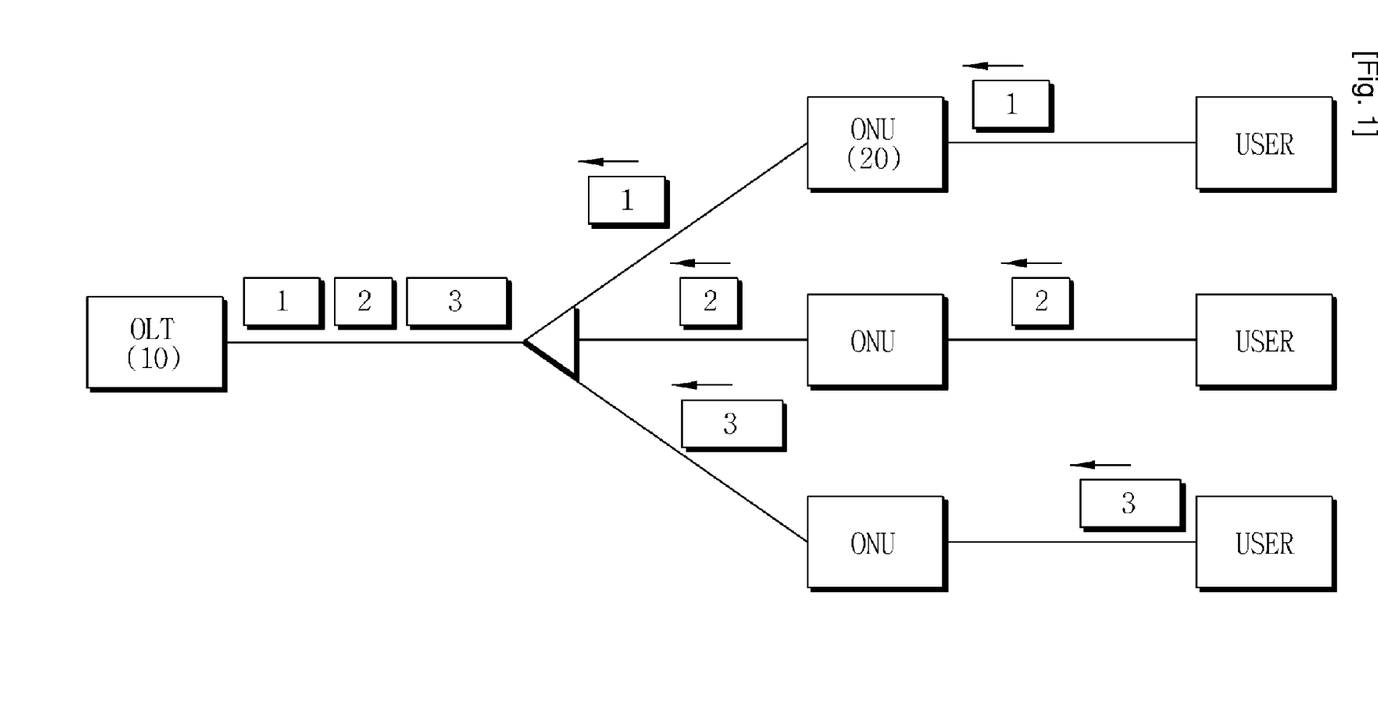
FIG. 1 is a configuration diagram of a Passive Optical Network (PON)

FIG. 1 is a configuration diagram of a Passive Optical Network (PON).

As illustrated in FIG. 1, the PON has a tree structure where a Optical Line Terminal (OLT) 10 1:N corresponds to a plurality of Optical Network Units (ONUs) 20 via a passive element. In the case of downstream transmission from the OLT 10 to the ONUs 20, since data transmitted from the OLT 10 is broadcasted to all the ONUs 20, no problem due to shared medium will occur. However, in the case of upstream transmission from the ONUs 20 to the OLT 10, since the plurality of ONUs 20 are connected to the OLT 10 via optical fibers of the passive element, a Time Division Multiple Access Medium Access Control (TDMA MAC) protocol is needed for accessing medium while avoiding overlapping in time and data collision.

Figure 2:
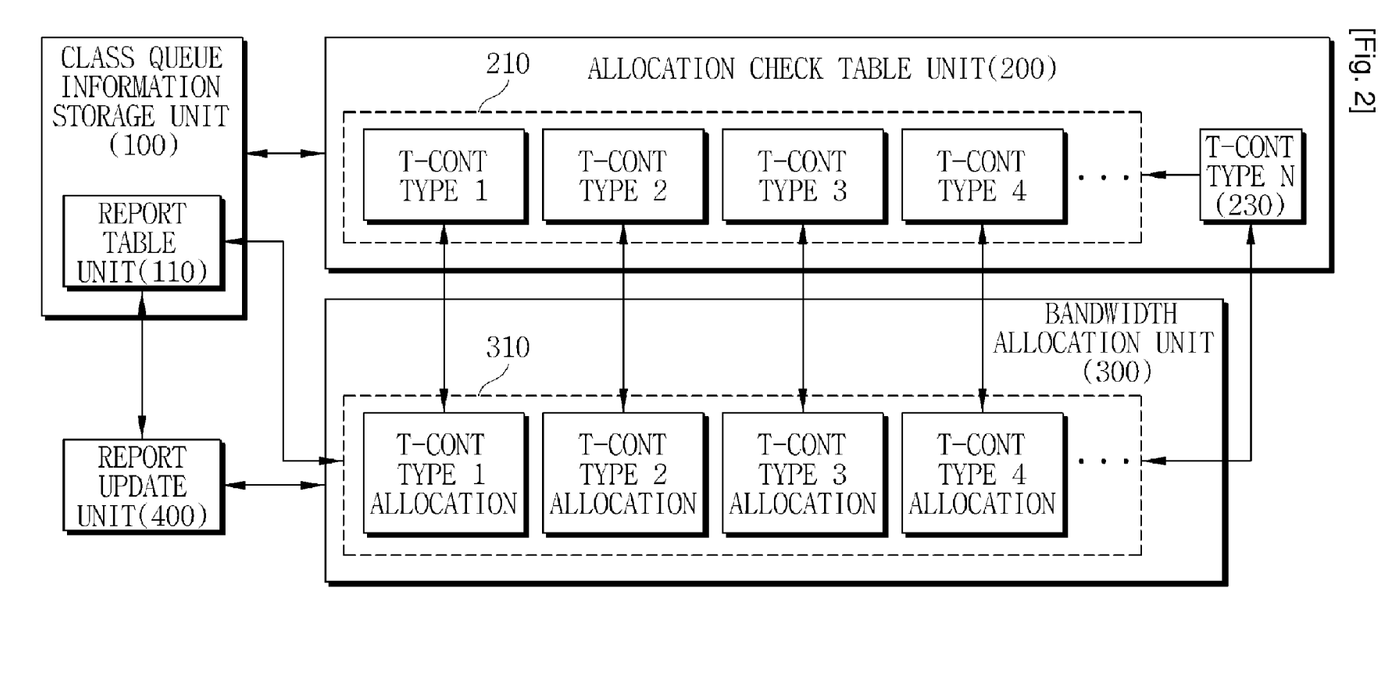
FIG. 2 is a block diagram of a dynamic bandwidth allocation apparatus for uplink data transmission of a plurality of Optical Network Units (ONUs), according to an embodiment of the present invention.

FIG. 2 is a block diagram of a dynamic bandwidth allocation apparatus, according to an embodiment of the present invention.

The dynamic bandwidth allocation apparatus includes a class queue information storage unit 100, an allocation check table unit 200, a bandwidth allocation unit 300, and a report update unit 400. The class queue information storage unit 100 stores information regarding a bandwidth allocation period and an allocatable bandwidth amount of each T-CONT calculated to satisfy Quality of Service (QoS) contracted for the T-CONT on the basis of Service Level Agreement (SLA).

For example, in the case of T-CONT types 1 and 2 which provide only a QoS service, a bandwidth allocation period and an allocatable bandwidth amount for each of the T-CONT types 1 and 2 are stored. Meanwhile, in the case of a T-CONT type 3 which provides both a QoS service and a non-QoS service, two bandwidth allocation periods and two allocatable bandwidth amounts for the T-CONT type 3 are stored.

The class queue information storage unit 100 includes a report table unit 110. The report table unit 110 classifies T-CONTs into T-CONT types 1, 2, 3, and 3 (210) and stores wait state information about the T-CONT types 1, 2, 3, and 4 (210). The report update unit 400 collects wait state information related to the T-CONT types 1, 2, 3, and 3 (210) to which uplink bandwidths are allocated by the bandwidth allocation unit 300 which will be described later, and updates information about T-CONT types stored in the report table unit 110.

The allocation check table unit 200 receives information regarding bandwidth allocation periods and allocatable bandwidth amounts which are stored for the T-CONT types 1, 2, 3, and 4 (210), from the class queue information storage unit 100, checks a bandwidth allocation period for each T-CONT type, and determines an allocatable bandwidth amount for the T-CONT type. The allocation period information is stored as timer information, and updated by the bandwidth allocation unit 300 which will be described later. The allocation check table 200 receives information regarding a bandwidth allocation period and an allocatable bandwidth amount for each T-CONT, from the class queue information storage unit 100, and constructs T-CONT types 1, 2, 3, and 4 (210) for each service type on the basis of the information.

Then, the allocation check table unit 200 checks bandwidth allocation periods of the T-CONT types 1, 2, 3, and 4 (210) for each service type on the basis of the information for each T-CONT, and determines bandwidth allocation amounts of the T-CONT types 1, 2, 3, and 4 (210).

The bandwidth allocation unit 300 allocates an uplink bandwidth to each T-CONT type, with reference to the information about the T-CONT types 1, 2, 3, and 4 (210), which is obtained from the allocation check table 200 and the report table unit 110 included in the class queue information storage unit 100. Here, the information about each T-CONT type includes a bandwidth allocation period, an allocatable bandwidth amount, and wait state information of the T-CONT. The bandwidth allocation unit 300 calculates the uplink bandwidth amount of each T-CONT type using the timer information. Accordingly, the bandwidth allocation unit 300 allocates an uplink bandwidth to each T-CONT type, and re-allocates an uplink bandwidth which remains, if any, after bandwidth allocation, to the T-CONT types 1, 2, 3, and 4 (210).

According to an embodiment of the present invention, the bandwidth allocation unit 300 checks bandwidth allocation periods of the T-CONT types 1, 2, 3, and 4 (210) received from the allocation check table 200, and calculates uplink bandwidth amounts that are to be allocated to T-CONTs whose bandwidth allocation periods have been expired. For this operation, the bandwidth allocation unit 300 receives wait state information about each T-CONT, which is stored in the class queue information storage unit 100, from the report table unit 110. The received wait state information is wait state information about a T-CONT whose bandwidth allocation period has been expired. Then, the bandwidth allocation unit 300 compares the allocatable bandwidth amount of the T-CONT whose bandwidth allocation period has been expired, with the wait state information received from the report table unit 110, and determines the smaller value of the two as a bandwidth allocation amount of the T-CONT. Then, the bandwidth allocation unit 300 allocates the determined bandwidth allocation amounts as uplink bandwidths to the T-CONT types 1, 2, 3, and 4 (210) of the allocation check table unit 200.

In this manner, if the uplink bandwidths are uniformly allocated to ONUs, the bandwidth allocation unit 300 allocates the uplink bandwidths to the T-CONT types 1, 2, 3, and 4 (210) according to priorities of the T-CONT types 1, 2, 3, and 3 (210).

Meanwhile, the bandwidth allocation unit 300 calculates a bandwidth allocation amount that is to be allocated to each of the T-CONT types 1, 2, 3, and 4 (120), and a total amount of used bandwidth including frame overhead, in real time, and determines whether the total amount of used bandwidth exceeds a total uplink bandwidth. If the total amount of used bandwidth exceeds the total uplink bandwidth, the band allocation unit 300 re-calculates a bandwidth allocation amount of a T-CONT to which a bandwidth is to be allocated so that the total amount of used bandwidth does not exceed the total uplink bandwidth.

Meanwhile, if the total amount of used bandwidth that is to be allocated to the T-CONT types 1, 2, 3, and 4 (210) does not exceed the total uplink bandwidth, the bandwidth allocation unit 300 re-allocates the remaining uplink bandwidth to the T-CONT types 1, 2, 3, and 4 (210). Referring to FIGS. 1, and 2, if any uplink bandwidth remains after the uplink bandwidth is allocated to the T-CONT types 1, 2, 3, and 4 (210) by the bandwidth allocation unit 300, the bandwidth allocation unit 300 divides the remaining uplink bandwidth by the number of ONUs 20 connected to the OLT 10 and obtains an additional uplink bandwidth in order to additionally allocate the remaining uplink bandwidth. Accordingly, the OLT 10 allocates the additional uplink bandwidth to each ONU 20 connected to the OLT 10. Then, the allocation check table unit 200 stores a value of the additional uplink bandwidth in a virtual T-CONT type N 230.

Therefore, the ONU 20 transmits data corresponding to the uplink bandwidth allocated to the T-CONT types 1, 2, 3, and 3 (210), from the T-CONT types 1, 2, 3, and 4 (210). Meanwhile, the ONU 20 can additionally transmit data from the T-CONT types 1, 2, 3, and 4 (210), using the additional uplink bandwidth value allocated to the T-CONT type N 230.

For example, it is assumed that the number of ONUs 20 that are currently activated is 5, and a maximum uplink bandwidth for a frame is 19000 bytes. If 5000 bytes remain after bandwidths are allocated to T-CONT types of each ONU 20, the OLT 10 divides the 5000 bytes by the number 5 of the ONUs 20.

Accordingly, 1000 bytes are allocated to each ONU 20. Then, the allocation check table unit 200 stores the 1000 bytes in the virtual T-CONT type N 230. Thereafter, the ONU 20 transmits data corresponding to a uplink bandwidth allocated to each T-CONT type, from the T-CONT type. Then, each T-CONT type additionally transmits data using the 1000 bytes allocated to the T-CONT type N 230. By processing the remaining uplink bandwidth in this manner, it is possible to improve the efficiency of data transmission to ONUs 20 and guarantee transmission quality.

Hereinafter, a dynamic bandwidth allocation method for uplink data transmission of a plurality of ONUs, according to an embodiment of the present invention, will be described in detail with reference to FIG. 3.

Figure 3:
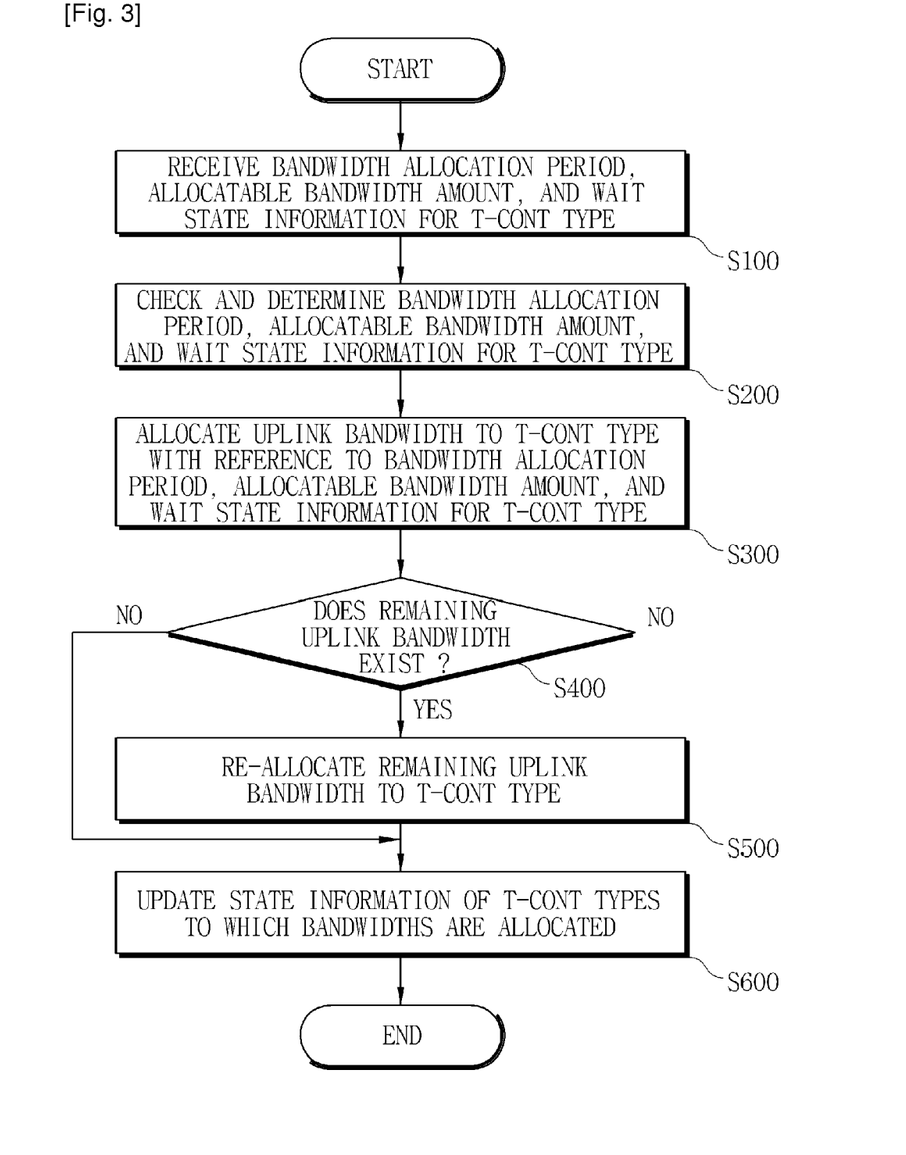
FIG. 3 is a flowchart of a dynamic bandwidth allocation method for uplink data transmission of a plurality of ONUs, according to an embodiment of the present invention.
Figure 4:
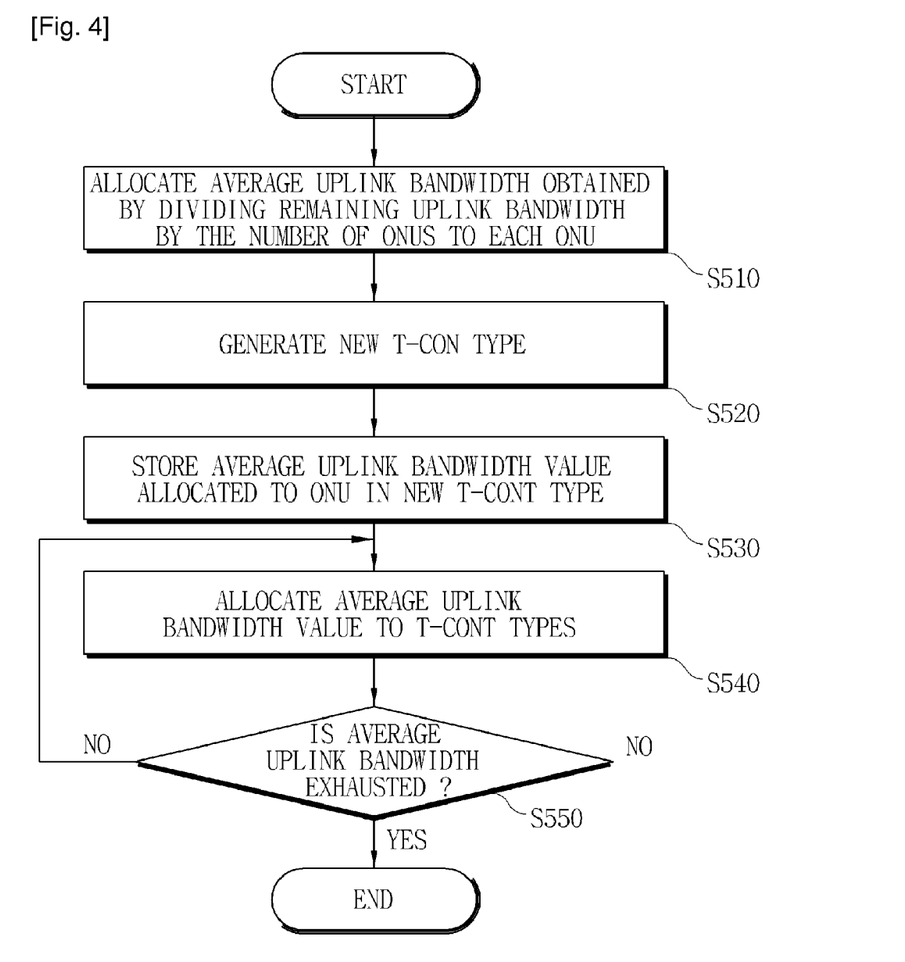

FIG. 3 is a flowchart of a dynamic bandwidth allocation method for uplink data transmission of a plurality of ONUs, according to an embodiment of the present invention.

First, a bandwidth allocation period, an allocatable bandwidth amount, and wait state information for each T-CONT type are received from a class queue information storage unit (operation S100). Here, the bandwidth allocation period and the allocatable bandwidth amount are calculated to satisfy QoS contracted for each T-CONT on the basis of SLA. Also, the wait state information relates to T-CONTs whose bandwidth allocation periods and allocatable bandwidth amounts are calculated.

Then, as illustrated in FIG. 2, T-CONT types 1, 2, 3, and 4 related to the received information are constructed for each service type. Thereafter, the allocation check table unit checks the bandwidth allocation periods of T-CONT types 1, 2, 3, and 4 constructed for each service type on the basis of the received information for each T-CON, and determines a bandwidth allocation amount for each T-CONT type (operation 200). If the bandwidth allocation periods are checked and the bandwidth allocation amounts are determined, uplink bandwidths are allocated to the T-CONT types 1, 2, 3, and 4 by a bandwidth allocation unit (operation S300).

When the bandwidth allocation unit allocates the uplink bandwidth to each T-CONT type, the bandwidth allocation unit determines whether a total uplink bandwidth use amount including the bandwidth allocation amounts and frame overhead exceeds a total uplink bandwidth (operation S400).

If the total uplink bandwidth use amount including the bandwidth allocation amounts and frame overhead exceeds the total uplink bandwidth, the bandwidth allocation unit re-calculates bandwidth allocation amounts of the T-CONT types 1, 2, 3, and 4 to which bandwidths are to be allocated, so that a total of the bandwidth allocation amounts does not exceed the total uplink bandwidth. The state information of the T-CONT types 1, 2, 3, and 4 to which the total uplink bandwidth is allocated is updated by a report update unit (operation S600). Meanwhile, if any uplink bandwidth remains after the uplink bandwidth is allocated to the T-CONT types 1, 2, 3, and 4, the remaining uplink bandwidth is allocated to the T-CONT types 1, 2, 3, and 4. Accordingly, the remaining uplink bandwidth is all used (operation S500). That is, if the remaining uplink bandwidth is allocated to each ONU, each ONU allocates the remaining uplink bandwidth to the T-CONT types 1, 2, 3, and 4 according to the priorities of the T-CONT types 1, 2, 3, and 4.

According to another embodiment of the present invention, the remaining bandwidths can be allocated to each ONU in proportion to a queue length for the ONU, and also in proportion to the amount of traffic of the ONU. Also, the remaining bandwidths can be allocated to each ONU in proportion to a guaranteed service rate at which the ONU receives downlink data.

If an additional uplink bandwidth value is allocated to each ONU in this manner, each ONU, as illustrated in FIG. 2, stores an additional uplink bandwidth value in a virtual T-CONT type N through an allocation check table. The additional uplink bandwidth value stored in the virtual T-CONT type N is allocated to T-CONT types 1, 2, 3, and 4 through the ONU, respectively. Here, the additional uplink bandwidth value is allocated to each ONU, in the order of the T-CONT types 1, 2, 3, and 4, in correspondence to service priorities of the T-CONT types 1, 2, 3, and 4. Accordingly, the remaining uplink bandwidth all can be consumed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be efficiently applied to an optical network-related technical field which uses a technique of dynamically allocating a bandwidth to transmit uplink data on a Time Division Multiple Access-based Passive Optical Network (TDMA PON).

The invention claimed is:

1. A dynamic bandwidth allocation apparatus for uplink data transmission of a plurality of Optical Network Units (ONUs) including a plurality of class queues corresponding to Transmission Container (T-CONT) types, the plurality of ONUs connected to an Optical Line Terminal (OLT) on a Passive Optical Network (PON), comprising:
   a class queue information storage unit storing information regarding a bandwidth allocation period and an allocatable bandwidth amount for each T-CONT type;
   an allocation check table unit checking the bandwidth allocation period for the T-CONT type received from the class queue information storage unit, and determining an allocatable bandwidth amount for the T-CONT type; and
   a bandwidth allocation unit allocating an uplink bandwidth to the T-CONT type with reference to the bandwidth allocation period and the allocatable bandwidth amount for the T-CONT type, and re-allocating to each T-CONT type an uplink bandwidth remaining after allocating a total uplink bandwidths to all T-CONT types,
   wherein the re-allocating to each of the T-CONT type of the uplink bandwidth remaining after allocating the total uplink bandwidths to all T-CONT types is configured to be obtained by dividing the remaining uplink bandwidth by the number of ONUs to obtain an additional uplink bandwidth, and
   wherein the additional uplink bandwidth is configured to be allocated to each of the ONU, and; and
   wherein the additional uplink bandwidth is configured to sequentially allocated to a virtual T-CONT type according to priorities of the T-CONT types;
   wherein the additional uplink bandwidth value allocated to the ONU is configured to be stored in the virtual T-CONT type, and
   wherein the remaining uplink bandwidth is configured to be allocated to each of the plurality of ONUs prior to uplinking the data transmission of the plurality ONUs connected to the OLT on the PON.

2. The apparatus of claim 1, wherein the class queue information storage unit comprises:
   a report table unit storing wait state information for each of the T-CONT types;
   a report update unit collecting the wait state information and allocatable bandwidth amounts of the T-CONT types allocated by the bandwidth allocation unit, and updating the wait state information of the T-CONT types stored in the report table unit.

3. The apparatus of claim 1, wherein, when the additional uplink bandwidth value obtained by dividing the remaining uplink bandwidth by the number of ONUs is allocated to each of the ONUs, the allocation check table unit generates the virtual T-CONT type, which is configure to store the additional uplink bandwidth in the virtual T-CONT type.

4. The apparatus of claim 3, wherein the bandwidth allocation unit additionally allocates the additional uplink bandwidth stored in the virtual T-CONT type to the T-CONT types of the ONU, through the allocation check table, according to the priorities of the T-CONT types, and stops allocating the additional uplink bandwidth value when the additional uplink bandwidth value is all consumed.

5. A dynamic bandwidth allocation method for uplink data transmission of a plurality of Optical Network Units (ONUs) including a plurality of class queues of transmission containers (T-CONTs) types on a Passive Optical Network (PON), comprising:
   checking a bandwidth allocation period for each T-CONT type, and determining an allocatable bandwidth amount of each T-CONT type with reference to wait state information corresponding to the bandwidth allocation period;
   allocating uplink bandwidths to T-CONT types with reference to the bandwidth allocation period and the allocatable bandwidth amount, and re-allocating to the T-CONT types an uplink bandwidth remaining after allocating the uplink bandwidths to the T-CONT types so that the remaining uplink bandwidth is all consumed; and
   updating state information of the T-CONT types using the re-allocated uplink bandwidth of the T-CONT types and the wait state information,
   wherein the allocating of the uplink bandwidths to the T-CONT types and the re-allocating of the remaining uplink bandwidth further comprises:
   dividing the remaining uplink bandwidth by the number of ONUs to obtain an additional uplink bandwidth, allocating the additional uplink bandwidth to each ONU, and generating a virtual T-CONT type;
   storing the additional uplink bandwidth value allocated to the ONU, in the virtual T-CONT type;
   sequentially allocating the additional uplink bandwidth allocated to the virtual T-CONT type, according to priorities of the T-CONT types; and
   stopping allocating the additional uplink bandwidth value after allocating the additional uplink bandwidth value to each of all the T-CONT types, and
   wherein the remaining uplink bandwidth is allocated to each of the plurality of ONUs prior to uplinking the data transmission to the OLT.

6. The method of claim 5, wherein the allocating of the uplink bandwidths to the T-CONT types and the re-allocating of the remaining uplink bandwidth comprises allocating the remaining uplink bandwidth to each ONU in proportion to a queue lengths of the ONU.

7. The method of claim 5, wherein the allocating of the uplink bandwidths to the T-CONT types and the re-allocating of the remaining uplink bandwidth comprises estimating an amount of traffic for each ONU and allocating the remaining uplink bandwidth to the ONU in proportion to the amount of traffic for the ONU.

8. The method of claim 5, wherein the allocating of the uplink bandwidths to the T-CONT types and the re-allocating of the remaining uplink bandwidth comprises calculating a guaranteed service rate at which downlink data is transmitted to each ONU, and allocating the remaining uplink bandwidth to the ONU in proportion to the service rate of the ONU.

9. A dynamic bandwidth allocation apparatus for uplink data transmission of a plurality of Optical Network Units (ONUs) including a plurality of class queues corresponding to Transmission Container (T-CONT) types, the plurality of ONUs connected to an Optical Line Terminal (OLT) on a Passive Optical Network (PON), comprising:

a class queue information storage unit storing information regarding a bandwidth allocation period and an allocatable bandwidth amount for each T-CONT type;

an allocation check table unit checking the bandwidth allocation period for the T-CONT type received from the class queue information storage unit, and determining an allocatable bandwidth amount for the T-CONT type; and a bandwidth allocation unit allocating an uplink bandwidth to the T-CONT type with reference to the bandwidth allocation period and the allocatable bandwidth amount for the T-CONT type, re-allocating to each of the T-CONT types an uplink bandwidth remaining after allocating a total uplink bandwidths to all T-CONT types by dividing the remaining uplink bandwidth by the number of ONUs to obtain an additional uplink bandwidth in order to sequentially allocate the additional uplink bandwidth value allocated to the ONUs according to priorities of the T-CONT types, and wherein the remaining bandwidths are allocated to each of the plurality of ONUs in proportion to the bandwidth allocation period and the allocatable bandwidth amount for the each of the respective T-CONT types.

* * * * *